(No Model.)
D. H. WHITTEMORE.
FRUIT PRESS.
No. 250,317. Patented Nov. 29, 1881.
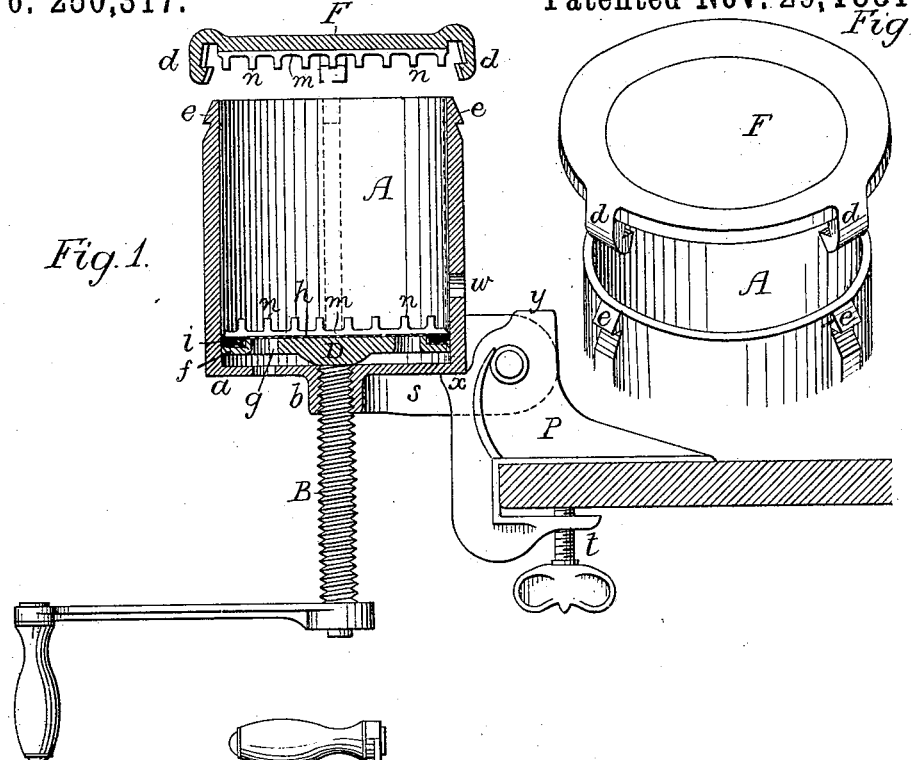
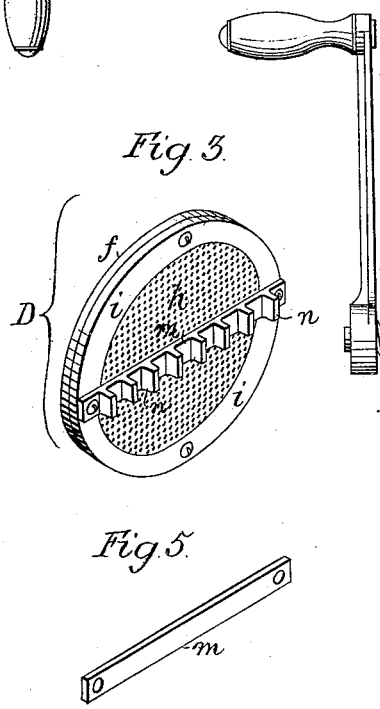
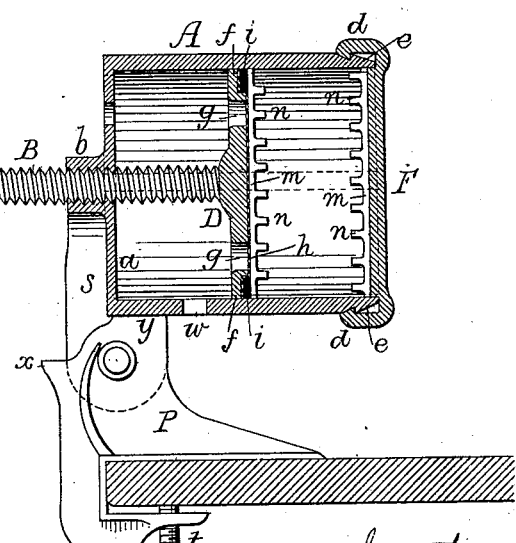
Witnesses:
David S. Williams
Harry Smith
Inventor:
David H. Whittemore
by his Attorneys
Howson and Sons

UNITED STATES PATENT OFFICE.

DAVID H. WHITTEMORE, OF WORCESTER, MASSACHUSETTS.

FRUIT-PRESS.

SPECIFICATION forming part of Letters Patent No. 250,317, dated November 29, 1881.

Application filed November 3, 1881. (No model.)

*To all whom it may concern:*

Be it known that I, DAVID H. WHITTEMORE, a citizen of the United States, residing in Worcester, Worcester county, Massachusetts, have invented certain Improvements in Fruit-Presses, of which the following is a specification.

The main object of my invention is to so construct a fruit-press that the pulp will be thoroughly macerated during the pressing operation, so as to permit the extraction of all of the juice, a further object being to facilitate the introduction of the fruit into the press and to provide for the ready removal of the pressed pulp therefrom.

In the accompanying drawings, Figure is a vertical sectional view of my improved fruit-press ready to receive a charge; Fig. 2, a view of the press as it appears when in use; Fig. 3, a perspective view of the plunger; Fig. 4, a perspective view of the end of the vessel and its cap, and Fig. 5 a detached perspective view of a modification of one part of my invention.

A is a cylindrical vessel, closed at one end and open at the other, the closed end $a$ of the vessel having formed thereon a nut, $b$, to which is adapted a threaded stem, B, the inner end of which carries the plunger D, the outer end of the stem being furnished with a suitable operating crank or handle.

To the open end of the vessel A is adapted a cover, F, which snugly fits the vessel, and is secured in place by the engagement of lugs $d$ on the cover with lugs $e$ on the vessel, the lugs being caused to engage with each other by first fitting the cover to the vessel so that its lugs occupy the spaces between the lugs of the vessel, and then partially turning the cover. The contact-faces of the lugs $d$ on the cover are preferably inclined slightly, so as to draw the cover snugly to its place as it is turned.

The plunger D consists of a disk, $f$, secured to the screw-stem B, and having perforations $g$; and on the face of the plunger is a plate, $h$, of wire-gauze or perforated sheet metal, the edge of which is adapted to an annular groove in the edge of the disk $f$, and is confined therein by a ring, $i$. The plunger D and the cover F are each provided with a transverse bar, $m$, having ribs $n$, for a purpose described hereinafter.

The closed end of the vessel A has a projecting lug or ear, $s$, which is pivoted to a bracket, P, jaws on the latter being adapted to embrace the edge of the table, and one of the jaws being furnished with a thumb-screw, $t$, whereby the bracket is secured to the table, the vessel A being free to be turned either to the vertical position shown in Fig. 1 or to the horizontal position shown in Fig. 2, suitable stops, $x$ and $y$, on the bracket P serving to retain the vessel in either of these positions.

The operation of the device is as follows: The vessel A being in the vertical position shown in Fig. 1, with the cover F removed and the plunger D retracted to its full extent, the fruit or other substance to be pressed is placed in the vessel on the top of the plunger, and the cover F is applied. The vessel is then turned to the horizontal position shown in Fig. 2 and the screw-stem is turned, thus imparting a combined advancing and rotating movement to the plunger D, the contents of the vessel being gradually pressed between the plunger and the cover F, and the juice expressed therefrom passing through the screen $h$ and openings $g$ of the plunger, and through an opening, $w$, in the vessel A into a receptacle suitably placed to receive it. As the rotating plunger moves forward the ribbed bar $m$ of the plunger tends to cause the mass of pulp in advance of the same to rotate with the plunger, while the bar $m$ of the cover tends to resist such rotation; hence the pulp is torn or disintegrated, and the free flow of juice is facilitated. Plain bars, such as shown in Fig. 5, may be substituted for the ribbed bars; or, in some cases, simple projections on the plunger and cap, or on either of them, may be substituted for the bars. The latter, however, are preferred.

I claim as my invention—

1. The combination of the vessel A of a fruit-press with a screw-shaft having a plunger which rotates with the shaft, and is furnished with a projection or projections, whereby as the plunger is advanced and rotated the pulp in advance of the same is torn or disintegrated, as set forth.

2. The combination of the vessel A, the screw-shaft B, having a plunger, D, and the end plate or cover, F, both end plate and plunger being furnished with disintegrating-projections, as set forth.

3. The combination of a clamping-bracket with a vessel, A, having a screw-plunger, D, and hung to the bracket, as described, whereby it can be turned to either a vertical position or a horizontal position, as specified.

4. The combination of the bracket having stops $x$ and $y$ with the vessel A, pivoted to the bracket, as set forth.

5. The combination of the pivoted vessel A, having a closed end, $a$, with nut $b$, the plunger D, the screw-stem B, adapted to the nut $b$, and the cover-plate F, detachably secured to the open end of the vessel A, as specified.

6. The combination of the plate $f$ of the plunger D, having openings $g$, with the perforated strainer-plate $h$, secured to the face of the said plate $f$, as set forth.

In testimony whereof I have signed my name to this specification in the presence of two subscribing witnesses.

DAVID H. WHITTEMORE.

Witnesses:
HARRY DRURY,
HARRY SMITH.